United States Patent [19]

Boos et al.

[11] 4,205,363
[45] May 27, 1980

[54] FUEL IGNITOR COMPRISING A NOVEL SILICON CARBIDE COMPOSITION

[75] Inventors: Charles J. Boos, Lewiston; Elwood B. Hausler, Grand Island; James A. Hirsch, Niagara Falls; Martin R. Kasprzyk, Buffalo; Elmer G. Smith, Niagara Falls, all of N.Y.

[73] Assignee: The Carborundum Company, Niagara Falls, N.Y.

[21] Appl. No.: 920,574

[22] Filed: Jun. 29, 1978

Related U.S. Application Data

[62] Division of Ser. No. 666,297, Mar. 12, 1976, Pat. No. 4,120,827.

[51] Int. Cl.² ............................................. F23Q 7/00
[52] U.S. Cl. .................................... 361/264; 219/270; 219/553; 106/44; 252/516; 264/61

[58] Field of Search ............... 219/260, 270, 552, 553; 252/512, 516; 106/44; 264/61, 65, 332; 361/264, 265, 266; 123/145 A

[56] References Cited

U.S. PATENT DOCUMENTS

| | | | |
|---|---|---|---|
| 3,236,780 | 2/1966 | Ozarow | 252/516 X |
| 3,554,717 | 1/1971 | Shaffer et al. | 106/44 X |
| 3,853,566 | 12/1974 | Prochazka | 264/65 X |
| 3,875,477 | 4/1975 | Fredriksson et al. | 252/516 X |
| 3,993,602 | 11/1976 | Prochazka | 252/516 |
| 4,120,827 | 10/1978 | Boos et al. | 252/512 |

Primary Examiner—Volodymyr Y. Mayewsky
Attorney, Agent, or Firm—David E. Dougherty; Raymond W. Green; Michael L. Dunn

[57] ABSTRACT

A composition comprising negatively doped hot pressed particulate silicon carbide, the process for making the composition, an electrical hot surface fuel ignitor manufactured from the composition, a silicon brazed electrical connection for the ignitor and an ignitor circuit containing a dropping resistance.

5 Claims, No Drawings

FUEL IGNITOR COMPRISING A NOVEL SILICON CARBIDE COMPOSITION

This is a division of copending application Ser. No. 666,297, filed Mar. 12, 1976, now U.S. Pat. No. 4,120,827.

BACKGROUND OF THE INVENTION

A. Field of the Invention

This invention concerns an electrically operated fuel ignitor for use with appliances utilizing gaseous fuel. The invention more particularly concerns electrically operated gas ignitors for use with appliances such as gas operated stoves.

B. History of the Prior Art

In the prior art, appliances utilizing gaseous fuel such as hydrocarbon gases were ignited by means of a pilot light which was usually a small flame maintained by burning hydrocarbon gas. The gas fired pilot light usually consumed from about 10 to about 40 percent of the gas used by the appliance and the gas consumed by the pilot light provided no other benefit except providing for ignition of major fuel burners. Otherwise, the gas operating the pilot light was wasted. An advance was made in the prior art when electrical ignitors were developed. These ignitors either became or were maintained above ignition temperature by an electrical current to ignite the fuel burners. Such prior art electrical ignitors however were generally of short life, consumed excessive amounts of electrical current or reached ignition temperature too slowly for range top application. In the prior art there were two general types of electrical gas ignitors one of which ignited the gas by means of an electrical spark between two electrodes. This type of ignitor requires high voltage electrical energy and is subject to failure due to pitting and burning of the electrodes by the spark. Such spark type ignitors further require high voltage transformers, capacitors and other complicated electronic components to make the spark ignitor functional, particularly when repeated sparking is required in the event that ignition of the fuel does not promptly occur or in the event that for some reason combustion of the fuel stops.

The second type of ignitor for gaseous fuels are the hot surface gas ignitors which comprise a body which is heated above ignition temperature of the gas when sufficient electrical current passes through the body of the ignitor. In the prior art hot surface gas ignitors were made from numerous materials including platinum, molybdenum disilicide and silicon carbide. In order for a hot surface gas ignitor to be satisfactory the material of its construction must possess adequate oxidation resistance, must have suitable electrical properties and must be thermal shock resistant. In addition the ignitor must reach ignition temperature rapidly. It is also desirable that the material of the construction of the gas ignitor not be an insulator yet have a large high temperature volume resistivity so that a large voltage drop occurs and only a low current flows. Such low current flow minimizes the cost of the power supply for the ignitor and reduces the cost of electrical energy. Platinum and molybdenum disilicide have metallic conduction and therefore have unsuitably low electrical resistance. Silicon carbide however, has an electrical resistivity which is substantially higher than platinum and molybdenum disilicide. Prior art silicon carbide hot surface gas ignitors were not, however, suitable since high voltages were required to overcome the cold electrical resistance of the silicon carbide, relative to the voltage needed to maintain ignition temperature at the ignitor's hot resistance. Such prior art silicon carbide ignitors used 40 or more watts of energy to heat the ignitor above the ignition temperature of the gas. In addition, such ignitors were very slow, eg. over 6 seconds and usually over 10 seconds, before gas ignition temperature was reached. It has been found that this slow ignition time was partially due to the large size of the ignitor, ie. over 40 watts, to raise the temperature of the ignitor body over the ignition temperature of the gas and furthermore such prior art carbide ignitors were slow since the ignitors had a high cold resistance, relative to its hot resistance, which had to be overcome before sufficient electrical current could flow through the ignitor to heat it above the ignition temperature of the fuel. The cold resistance of such prior art ignitors was sometimes so high relative to its hot resistance that when sufficient voltage was applied to overcome the cold resistance, that same voltage would force unacceptably large amounts of current through the heated ignitor as a result of its lower hot resistance. Those large amounts of current would then result in overheating of the ignitor thus damaging it, destroying it or reducing its useful life. Attempts at reducing the size of such silicon carbide hot surface ignitors in order to reduce voltage and energy requirements were unsuccessful. While reducing the length of the ignitor reduces cold resistance thus reducing initial voltage requirements, the result is an ignitor which is either much too slow for most practical applications or would overheat. This is true because reducing the length of the ignitor did not change the ratio of cold to hot resistance of the ignitor. Furthermore, prior art silicon carbide compositions had insufficient strength at the small sizes required unless additives were present. Such additives incorporated into the silicon carbide usually resulted in an undesirable altering of the electrical properties of the ignitor by increasing the ratio of cold to hot resistance which in turn increased heat up time, decreased the life of the ignitor unless complex circuitry is used to regulate voltage, and increased the amount of electrical potential required to heat the ignitor to a temperature above the ignition temperature of the gas.

Prior art methods of manufacturing silicon carbide ignitors included reaction sintering which consists of siliconizing a carbon-silicon carbide mixture. The result of such reaction sintering was the presence of free silicon which undesirably alters the properties of the ignitor and was difficult to control. The free silicon could be removed in a high temperature furnace which resulted in a coarse microstructure in the ignitor which in turn resulted in an ignitor having insufficient strength. In the prior art attempts have been made to manufacture such ignitors by sintering silicon carbide through the use of boron containing additives which were necessary to achieve sufficient strength. The boron is again detrimental to the electrical properties of the ignitor since an unacceptably high ratio of cold to hot resistivity results.

For the above reasons, prior art silicon carbide compositions were not wholly suitable for the manufacture of hot surface ignitors.

BRIEF DESCRIPTION OF THE INVENTION

In accordance with the present invention a silicon carbide composition is provided which is highly desirable for the manufacture of novel silicon carbide hot surface ignitors which are superior to prior art hot surface ignitors since all previously discussed prior art disadvantages are eliminated or substantially minimized.

The composition comprises particulate silicon carbide desirably having an average particle size of about 20 microns which is hot pressed at a sufficient temperature, usually from about 1800° to about 2400° C. and a sufficient pressure, usually from about 70 to about 750 Kg/sq. cm. for a sufficient time, usually from about 5 to 400 minutes, to a density above about 2.5 grams per cc. The composition further comprises at least 95.0 weight percent silicon carbide which contains from about 0.005 to about 0.05 moles per 100 grams of composition of at least one dissolved negative doping element. The negative doping element is in sufficient excess of the total of all positive doping elements present in the composition to provide sufficient negative doping to the composition to reduce the cold volume resistivity of the composition to less than about 1.25 ohm cm. The composition has a ratio of cold volume resistivity at 20° C. to hot volume resistivity at 1200° C. of less than about 12 to 1.

There is further provided in accordance with the invention, a process for manufacturing the novel composition which comprises hot pressing particulate silicon carbide, the particles of which are desirably all below 20 microns in size. The particulate silicon carbide being pressed has a purity of at least about 95.0 weight percent and contains less than 0.0004 combined moles per 100 grams of composition of all positive doping elements, and from about 0.005 to about 0.05 moles per 100 grams of composition of dissolved nitrogen. The moles per unit weight of the nitrogen dissolved in silicon carbide is in excess of the moles per unit weight of the positive doping elements in the composition. The particulate silicon carbide is pressed at a sufficient temperature from about 1800° to about 2400° C. at a sufficient pressure of between about 70 to about 750 Kg/sq. cm. for a sufficient time of from about 5 to about 400 minutes to obtain a silicon carbide composition having the density of at least 2.5 grams per cubic centimeter.

The novel electrical fuel ignitor of the invention comprises an elongated body manufactured from the above composition. Preferably the ignitor is a bar having a length of from about 0.5 to about 5 cm. and a cross sectional area from about 0.0002 to about 0.007 sq. cm.

The invention further comprises a novel electrical connection and process for forming the connection by brazing a wire comprising a metal selected from the group consisting of tungsten, tantalum, molybdenum, and niobium, to the silicon carbide by melting silicon between the wire and the silicon carbide.

The invention also includes a novel electrical circuit for a hot surface ignitor which comprises placing a dropping resistance in electrical series with the ignitor to a sufficient voltage source to heat the ignitor to a temperature above the ignitor temperature of a gaseous fuel.

DETAILED DESCRIPTION OF THE INVENTION

The particulate silicon carbide which is hot pressed to form the composition in accordance with the invention preferrably has an average particle size below about 20 microns and more preferrably essentially all particles of the particulate silicon carbide have a size below about 20 microns. There is no absolute lower limit on the average particle size of the particulate silicon carbide. However, for ease of handling and to prevent losses due to convection or otherwise, the average particle size in general should be above about 0.1 micron.

Since larger particles generally result in hot pressed compositions having lower density, the particle size should be kept as low as practical. Higher composition density can be obtained at lower temperatures and pressures with smaller size particles. For example, the use of a particulate silicon carbide wherein essentially all particles have a particle size of less than about 8 microns is more desirable for use in obtaining the composition of the invention than when the particulate silicon carbide contains larger sized particles. For the same reason particulate silicon carbide wherein essentially all particles have a particle size of less than about 5 microns is a more desirable particulate silicon carbide than a particulate silicon carbide which has particles having the size of about 8 microns. The shape of the particles in the particulate silicon carbide varies and may be essentially any shape.

The silicon carbide for use in forming the composition of the invention is of high purity. The silicon carbide is at least 95 weight percent pure and desirably contains less than 0.004 moles of all combined positive doping elements per 100 grams of composition. "Mole" as used herein means gram molecular or gram atomic weight. "Moles per 100 grams" as used herein means gram molecular weight or gram atomic weight per 100 grams of composition, i.e. the weight percent of the element or compound divided by its atomic or molecular weight. "Combined Moles" means the sum of the gram molecular weights and gram atomic weights of the indicated elements and compounds. For convenience whenever an element is referred to, the atomic rather than molecular weight is used to calculate moles and moles per 100 grams.

The presence in the composition of essentially all metallic elements which are generally considered to have positive doping characteristics, adversely affect the electrical properties of the composition. The presence of such elements results in a ratio of cold resistivity to hot resistivity which is undesirably high which in turn, for the foregoing reasons, results in a composition which is less desirable for use in hot surface electrical ignitors. Such metallic elements include Aluminum, Gallium, Beryllium, Scandium, Boron, Indium, Chromium, Titanium, Molybdenum, Calcium, Gold and Zinc.

The least desirable of all metallic elements are those elements which are generally considered to have a positive valence of 3. Such elements particularly include the group III A elements of the periodic table and include the elements boron, aluminum, gallium, indium and thallium.

Positive doping elements such as the group III A elements are undesirable as impurities in the silicon carbide utilized in the composition. The presence of such elements results in a ratio of cold volume resistivity of silicon carbide to the hot volume resistivity which is unacceptable since the time for an ignitor manufactured from such a composition to heat to ignition temperature is too long and the life of the ignitor is shortened as previously discussed or in the alternative, means is required for lowering the voltage applied to the ignitor after the cold resistance of the ignitor is overcome.

In order to obtain proper electrical characteristics, i.e. a low ratio of cold volume resistivity to hot volume resistivity in the composition, it has been discovered that the composition must contain a negative doping element. Negative doping elements are those elements which when incorporated into semi-conductors such as silicon, germanium and silicon carbide, provide free electrons which can move through the semi-conductors when an electrical potential is applied across the semiconductor. For silicon carbide such negative doping elements are generally those elements which have five electrons in their outer shell and include all of the group V A elements. Such elements are nitrogen, phosphorous, arsenic, antimony and bismuth. The most effective and most suitable negative doping elements for use in the composition of the invention are nitrogen, phosphorous and arsenic. Nitrogen is particularly desirable due to its abundance lack of toxicity, and molecular size which permits the nitrogen to be readily diffused into the composition. Larger atoms such as antimony and bismuth diffuse into silicon carbide only with difficulty and are more easily incorporated into silicon carbide during the silicon carbide manufacturing process. Combinations of negative doping elements may be used to obtain an additive negative doping effect.

Desirably, the silicon carbide composition of the invention contains from about 0.005 to about 0.04 moles per 100 grams of at least one dissolved negative doping element. Such negative doping element is in sufficient mole excess of the total moles of all positive doping elements present in the composition to provide sufficient negative doping to the composition to reduce the cold volume resistivity to less than about 1.25 ohm cm. Cold volume resistivity is measured at 20° C. The addition of negative doping elements to reduce the cold volume resistivity of the silicon carbide composition is necessary to lower the ratio of cold volume resistivity to hot volume resistivity. Positive doping elements may not be used in the composition of the invention since the required electrical potential which must be applied across the ignitor manufactured from the composition is increased. Such increase results because positive doping elements have only three electrons in their outer shell. Electrons are therefore borrowed (accepted) from a neighboring carbon or silicon atom in order to obtain resultant positive holes which are free to move under the influence of an electrical potential. A substantially higher electrical potential is required to obtain the borrowing effect and therefore a substantially higher electrical potential must be applied before an ignitor containing an excess percentage of positive doping elements will operate. The required potential increase is observed more at lower temperature therefore the positive doping element undesirably increases the ratio of cold to hot resistivity.

In the case of a composition containing negative doping elements, which contain five electrons in their outer shell, four electrons from the outer shell interact with the four electrons in the outer shells of the silicon or carbon atoms in the composition. The fifth is then free to move and electrons do not need to be borrowed from neighboring silicon or carbon atoms. The result is that a lower electrical potential, when applied to an ignitor manufactured from a composition in accordance with the invention which contains excess negative doping elements, results in a substantially greater flow of electrical current at lower temperatures which in turn results in the ignitor reaching the ignition temperature of gaseous fuel at low voltage. The freedom of the excess electron is affected by a rise in temperature thus lowering hot resistivity as well as cold resistivity; however, the affect upon hot resistivity is not as great by percentage as the affect upon cold resistivity. The ratio of cold to hot resistivity of the compound is therefore reduced by the addition of negative doping elements.

Since ignitors manufactured from the composition of this invention are usually held at room temperature when not in use and are held at above gas ignition temperature when they are in use, the cold volume resistivity of the composition is measured at 20° C. and the hot volume resistivity of the composition is measured at 1200° C.

The silicon carbide composition in accordance with the invention contains sufficient negative doping to obtain a cold volume resistivity of less than about 1.25 ohm cms. and is preferrably below 0.9 ohm cm. to permit the use of lower voltages in conjunction with novel ignitors formed from the composition than was possible with ignitors of the same size formed from any prior art silicon carbide composition having comparable strength, thermal shock resistance and oxidation resistance.

The silicon carbide composition of the invention for the reasons previously discussed, further has sufficient negative doping to obtain a ratio of cold volume resistivity at 20° C. to hot volume resistivity at 1200° C. of less than 12 to 1 and preferrably less than 9 to 1.

An additional reason for using negative dopants is that when such dopants are present in the silicon carbide composition, the volume resistivity rapidly reaches a lowermost value as temperature increases at temperatures somewhat above gas ignition temperature. This result permits the ignitor to operate at a more constant temperature than materials which do not contain negative dopants even if there is a slight variation in voltage and controls temperature change at higher voltages. Runaway temperatures are therefore avoided and more rapid heat up times can be obtained since higher voltages can be used without destroying or damaging the ignitor. The opposite result occurs when excess positive doping elements such as aluminum or boron are present. Sufficient negative doping is generally obtained by incorporating from about 0.005 moles per 100 grams to saturation of at least one negative doping element into the composition. Saturation by the negative doping element usually occurs at about 0.05 moles per 100 grams but may occur at 0.04 moles per 100 grams of composition or lower. As the percentage of negative doping element in the composition increases, the cold volume resistivity decreases; therefore, high percentages of negative doping elements are desirable. A preferred lower limit for negative doping elements is about 0.015 moles per 100 grams of composition.

In order that sufficient negative doping element be present, it must provide enough free electrons to overcome the effect of the undesirable positive doping elements present. As a practical matter sufficient free electrons will be provided if there is over about 0.003 moles per 100 grams of composition of negative dopant in excess of the positive doping elements in the composition; however, the greater the excess of negative doping elements, the faster the ignitor, manufactured from the composition, will reach ignition temperature at a given voltage. As previously discussed, this is due to the decreased ratio of cold volume resistivity with respect to the hot volume resistivity of the composition which in turn results from the increased number of excess free electrons provided by excess negative doping elements in the composition.

In accordance with this invention the negative doping elements are preferably but not essentially dissolved in silicon carbide rather than reacted with the silicon carbide. "Dissolved" as used herein means a solid solution, i.e. incorporation of an impurity into the crystal lattice of the silicon carbide.

It is undesirable that excessive negative doping element chemically react with the silicon carbide since undesirable physical properties may result. For example, nitrogen will react at temperatures above about 1800° C. with silicon carbide to form silicon nitride and free carbon.

Certain other impurities in the particulate silicon carbide used to manufacture the composition of the invention or in the finished composition are undesirable. In certain processes such as reaction sintering for manufacturing silicon carbide bodies, free silicon is frequently present. Compositions of the invention should not contain more than 0.1 weight percent of free silicon since when the melting point of the silicon is approached (1420° C.) in an ignitor manufactured from a composition containing silicon, the resistivity of the silicon carbide rapidly drops off which results in loss of temperature control. Such a rapid drop in resistivity can easily cause overheating of the ignitor which results in burnout or serious damage. Free silicon can be removed from a reaction sintered silicon carbide body by high temperature furnacing; however, the removal of the free silicon weakens the body and it is difficult to fabricate the slender bars necessary for efficient ignitors.

More than about 2.0 weight percent of free carbon desirably should not be present in the silicon carbide composition since free carbon tends to oxidize at high temperatures thus weakening an ignitor manufactured from the composition. More than about 3 weight percent of silicon dioxide desirably should not be present in the silicon carbide composition since silicon dioxide increases the ratio of cold to hot resistivity.

In accordance with the invention there is provided a particular process for the manufacture of the desired silicon carbide composition. Previous methods for manufacturing silicon carbide bodies from particulate silicon carbide were undesirable for numerous reasons, e.g. reaction sintering consisting of siliconizing a carbon silicon carbide mixture results in the presence of free silicon. Free silicon alters the electrical properties and is difficult to control. Removal of free silicon with high temperature furnacing coarsens the micro-structure of the composition and bodies manufactured from the composition will be weak. Other sintering methods require the use of boron or aluminum containing additives to achieve sufficiently high densities to obtain required strength. Boron and aluminum are detrimental to the electrical properties as previously discussed. Bodies may be formed from particulate silicon carbide by re-crystalization. Such bodies have coarse microstructures and have insufficient strength. Silicon carbide can be deposited as a vapor upon a substrate which acts as a heat sink thus increasing heat up time and power consumption. Furthermore, vapor deposition is difficult to control. The secondary phase method of manufacturing silicon carbide products alters some of the desirable electrical properties of silicon carbide. Single crystal growth methods are difficult to control with regard to crystal size and type and electrical characteristics. In addition, even when such methods are successful, they are frequently impractical from the standpoint of the complicated and costly equipment and time required.

In accordance with the present process, silicon carbide is hot pressed by loading a hollow cylindrical mold which is preferably a graphite mold, with loose fine silicon carbide powder and compacting the powder at high pressure with graphite plungers while the mold assembly is heated.

Specifically particulate silicon carbide having a particle size and purity as previously discussed is hot pressed at a temperature of from about 1800° to about 2400° C. and preferably from about 2000° to about 2300° C. The pressure applied to the particulate silicon carbide is from 70 to about 750 Kg/sq. cm., preferably from about 70 to about 500 Kg/sq. cm. In accordance with the process of the invention in order to obtain the desired composition, the foregoing temperature and pressure is maintained on the particulate silicon carbide for from about 5 to about 400 minutes, preferably for from about 10 to about 120 minutes, and most preferably from about 20 to about 120 minutes.

The temperature, pressure and hold times are dependent primarily upon the particle size of the particulate silicon carbide. Smaller particles require lower temperatures, pressures and hold times than larger particles. At temperatures below 1800° C. an insufficiently dense and weak silicon carbide composition is generally formed while above about 2400° C. the silicon carbide rapidly decomposes.

Highly sinterable particulate silicon carbide having a small particle size may require minimal pressure e.g. as low as about 70 Kg/sq. cm. Maximum pressures are limited by mold strength and since graphite molds are usually used for silicon carbide a reasonable upper limit on the pressure is about 750 Kg/sq. cm. The hold time for application of temperature and pressure to the particulate silicon carbide is dependent upon the quantity of particulate silicon carbide being pressed. In addition, higher temperatures and pressures generally reduce the required hold time. In general at least five minutes is required at high temperature and pressure to press a small quantity of silicon carbide, e.g. less than about 2 grams. In general it has been found that for pressing particulate silicon carbide to form the composition of the invention, when less than 10.5 Kg of silicon carbide is being pressed, very little is gained by using hold times in excess of 400 minutes.

Pure colorless particulate silicon carbide can be used as particulate silicon carbide in accordance with the process of the invention; however, pure silicon carbide is difficult to manufacture and expensive to use. The use of pure silicon carbide is therefore impractical. The preferred silicon carbide is green silicon carbide which is manufactured in the presence of air. Such silicon carbide generally contains from about 0.1 weight percent (0.007 moles per 100 grams) to about 0.3 weight percent (0.021 moles per 100 grams) of nitrogen which gives the silicon carbide its characteristic green color. The preferred green silicon carbide contains less than 0.1 weight percent of free silicon, less than about 2.0 weight percent of free carbon, less than about 3.0 weight percent of silicon dioxide and less than about 0.004 moles per 100 grams of composition of positive doping elements.

In addition to the nitrogen present as a result of the manufacture of the particulate silicon carbide, additional negative doping elements optionally can be introduced into the silicon carbide at any time by further heating the silicon carbide in a nitrogen containing atmosphere. For example, additional nitrogen can be introduced by heating the particulate silicon carbide to between about 1500° C. to about 2000° C. in a nitrogen containing atmosphere, preferrably pure nitrogen, for from about 5 to 120 minutes. Generally sufficient additional nitrogen doping (introduction of nitrogen into the silicon carbide) can be obtained when the particulate silicon carbide is heated to between about 1600° C. to about 1900° C. for from about 30 to 90 minutes.

In order to introduce additional nitrogen into the silicon carbide, the nitrogen should contact all particles; therefore, the silicon carbide particles should be separated by the nitrogen containing atmosphere for a sufficient time period to introduce additional nitrogen into the particles. One means for contacting all of the particles of the particulate silicon carbide is to fluidize the particles with a nitrogen atmosphere at the desired temperature for a sufficient length of time.

Other negative doping elements can be introduced into the particulate silicon carbide prior to, at the time of, or subsequent to hot pressing. One means for introducing additional negative doping elements into the silicon carbide particles is by contacting particles with the vapor of an element selected from phosphorous, arsenic, antimony, bismuth and combinations thereof at elevated temperatures e.g. from about 1500° to about 2000° C. The resulting particulate silicon carbide generally will contain from about 0.005 to about 0.04 moles per 100 grams of composition of the additional negative doping element.

The hot pressing process for forming the composition of the invention tends to reduce the amount of negative doping element present. This is particularly true when the negative doping element is nitrogen. Therefore, while it may not be required, it has been found to be advantageous to introduce additional negative doping element into the particulate silicon carbide after the particulate silicon carbide is pressed into the composition of the invention. For example: from about 0.001 to about 0.04 moles per 100 grams of an element selected from the group consisting of nitrogen, phosphorous, arsenic, antimony, bismuth and combinations thereof may be incorporated into the composition after pressing. One means of introducing additional negative doping element after pressing is to cut the composition into shapes having a thickness of between about 0.015 to about 0.20 cm. and then exposing the thin shapes to the vapor of one of the negative doping elements or combinations thereof at a temperature from about 1500° to about 200° C. The preferred negative doping element for incorporation into the composition is nitrogen due to its abundance and non-toxic characteristics. Furthermore, nitrogen is a small atom which is compatible with the crystal structure of silicon carbide. Phosphorous is also a desirable negative doping element for incorporation into the composition since it is inexpensive and has a small atom which is also compatible with the silicon carbide crystal structure.

As previously discussed, the composition of the invention can be used in the manufacture of electrical hot surface fuel ignitors which have superior characteristics. In general such ignitors are cut from the composition.

Generally the smaller the ignitor the faster it heats up and a fast heat up time is essential when the ignitor is used in applications such as stove top ignitors for stove burners which utilize gaseous fuel. The small size of the ignitor reduces heat up time since the ratio of the energy to raise the mass of the ignitor up to ignition temperature to its operating power is very low. e.g., an ignitor consisting of a bar having a dimension of approximately 0.046 cm by 0.046 cm by 2.54 cm weighs only 0.135 gm. Such an ignitor takes about 5.2 calories to raise its mass to a temperature of 1200° C. at which it consumes about 24 watts. The ratio of energy to raise its mass to ignition temperature to its operating power is therefore about 0.22 calorie per watt. Furthermore, the small size of the ignitor results in low energy demand which in turn results in electrical savings. Such an ignitor heats up to ignition temperature in 2 or 3 seconds when the ignitor is manufactured from the composition of the invention.

A larger ignitor, e.g. one weighing about 1.26 gm. and having a length of about 30 cm., operates at 320 watts thus utilizing much larger quantities of energy. In addition, the time required to heat the ignitor to ignition temperature is substantially longer, e.g. from about 30 to about 60 seconds.

The power consumption of an ignitor is directly related to the surface area of the ignitor. Therefore, the surface area should be minimized in order to keep energy consumption low. When the size of the ignitor is kept small, the surface area of the ignitor is also kept small with respect to a larger ignitor having the same geometric configuration.

From an electrical power supply viewpoint, it is desirable to have a high voltage ignitor that carries low current. Thus an ignitor having an elongated body is required which is manufactured from a high resistivity material. The ignitor must possess sufficient strength to be handlable and shipable at the small dimensions required. Ignitors manufactured from the composition of the present invention meet these requirements.

Preferably, the ignitor is an elongated bar manufactured from the composition of the invention. The most preferred ignitor size, taking into consideration power consumption, surface area and strength is a bar having an essentially square or circular cross section, a cross sectional area of from about 0.0001 to about 0.004 sq. cm. and a length of from about 0.5 to about 5 cm.

The following examples illustrate the composition, process and ignitor of the invention:

EXAMPLE 1

500 grams of green silicon carbide powder containing about 0.23% nitrogen and having an average particle size of 2.7 microns is hot pressed in a graphite mold having an inside diameter of about 10 cm with a movable plunger arrangement. The mold barrel is approximately 25 cm in outside diameter and about 20 cm high.

Pressing is performed to pressure and not to mechanical stops to achieve maximum density. The mold is heated in a 25 cm inside diameter reduction furnace and pressure is applied to the plungers with a hydraulic ram. Temperatures are monitored on the mold with a sight tube and optical pyrometer.

The initial pressure on the material is about 14 Kg/sq. cm. and is increased gradually to reach about 435 Kg/sq. cm. when the maximum temperature of 2225° C. is obtained. The heat up time is about two hours and the temperature and pressure is maintained for four hours after which the furnace is allowed to cool while pressure is still maintained on the mold.

After the silicon carbide composition is removed from the mold, the density is found to be 2.56 grams per cu. cm. or about 79.8% of theoretical density and is found to contain about 0.13 weight percent (0.009 moles per 100 grams) nitrogen.

The resulting composition in the form of a billet having a thickness of about 2.25 cm. is ground with a diamond wheel on its flat surfaces to achieve a uniform thickness of 1.99 cm. The billet is epoxy glued to a ceramic plate and cut into slabs having a thickness of 0.046 cm. with a surface grinder equipped with a six inch diameter 0.030 inch thick metal bonded diamond wheel.

The individual slabs are remounted onto ceramic plates and cut into bars having cross sectional dimensions of 0.046 cm. by 0.046 cm. The length of the bar is the long length of the slabs. The bars are removed from the plates by heating with a propane torch to degrade the epoxy bond. Subsequent heating with the torch flame completely removes the epoxy from the bars. The bars are cut or broken into lengths of about 3 cm. Each end of the bar is passed through a loop at the end of separate tungsten wires and secured to the wires in that position. Some of the ignitors are electrically self-heated with a Variac power supply to reach 1700° C. in a glass flask purged with nitrogen flowing at 10 cubic feet per minute and held there for one hour to nitrogen dope the silicon carbide bars.

Before life testing the ignitor units operate at 65.5 volts and 0.375 amp. to give 1350° C. The average cold resistance is 960 ohm and the average hot resistance is 174 ohm. The ratio of cold volume resistivity to hot volume resistivity is 5.5. The material's hot resistivity is 0.12 ohm cm.

One of the ignitors is placed in electrical series with a 115 ohm resistor to a 102 volt power supply. Under these conditions the ignitor reaches a temperature of about 1280° C. which is slightly over the minimum 1250° C. temperature required. The ignitors time to reach 1250° C. is measured using a strip chart recorder with an infrared sensor monitoring the temperature. The average time to reach 1250° C. is found to be 3.4 seconds. The ignitor is then life tested at 40,000 cycles at 8 seconds on and 22 seconds off. 22 Seconds off permits complete cooling of the ignitor to room temperature. Even after 40,000 cycles, the ignitor reaches the ignition temperature in 4.1 seconds. When the series resistance is not used and a 61.5 volt power supply is used to compensate for the loss of the resistor, after 40,000 cycles the ignitor heats slowly and the miximum temperature reached by the ignitor becomes dangerously low at 15% negative deviation from the 61.5 volt supply.

EXAMPLE 2

A bar, as prepared in Example 1, is used except the distance between the tungsten wire contacts is reduced to about 0.75 cm. and the nitrogen doping is performed at 1850° C. for one-half hour. The ignitor operates at 24 volts and 0.475 amp for a power of 11.4 watts and a hot resistance of 50.5 ohm.

EXAMPLE 3

A bar as prepared in Example 1 is used except that it is cut to sufficient length to allow about 4 cm. between the tungsten wire contacts and nitrogen doping is performed at 1700° C. for two hours. The ignitor operates at 120 volts and 0.39 amp for a power of 46.8 watts and a hot resistance of 308 ohm.

EXAMPLE 4

The procedure of Example 1 is followed except subsequent nitrogen doping is not carried out. The ignitor without additional nitrogen doping has a higher cold resistance of 1440 ohm as compared with the ignitor cold resistance of 960 ohm of the additionally doped ignitor. The ignitor which is not additionally doped further has a lower hot resistance of 140 ohm when compared with the hot resistance of 175 ohm of the doped ignitor. As a result, the cold to hot resistance ratio is greater in the ignitor without additional doping than in the ignitor with additional doping, i.e. 10.3 as compared with 5.5. The average time for the ignitor without additional doping to reach 1250° C. is about 0.9 second greater than the time required for the additionally doped ignitor at 102 volts.

Further, in accordance with the invention, there is provided a novel process for forming a novel electrical connection with a silicon carbide body. In accordance with the invention, a tungsten or alternatively molybdenum, tantalum or niobium conductor such as a wire is welded to silicon carbide with any suitable heat source utilizing silicon grains having a particle size of approximately 0.2 cm. Desirably the silicon carbide body is a bar having a cross sectional area of from about 0.0002 to about 0.004 sq. cm. and a length of from about 0.1 to about 5 cm. The bar is inserted into a snuggly fitting loop in a tungsten wire. Silicon grains as previously described are then melted between the tungsten and the silicon carbide to form a brazed junction between the wire and the silicon carbide bar.

The resulting brazed junction has substantial strength and is stable to repeated thermal shock which could be encountered when the silicon carbide bar is an ignitor which is repeatedly heated to temperatures of at least 1250° C. and cooled. The thermal stability and physical strength of the brazed junction seems to be due to the affinity of the silicon grains for both the wire and the silicon carbide bar and due to closely matching co-efficients of thermal expansion of the wire, silicon and silicon carbide. The wire having the most desirable co-efficient of expansion is a tungsten wire while molybdenum is desirable because of its workability. In addition, the connection is oxidation resistant.

Any suitable heat source for melting the silicon grains can be used. For example, the silicon can be melted by means of a plasma welder, an electron beam or a laser. In addition, the silicon may be melted by high temperature furnacing or by electrically heating the ignitor above the melting point (1412° C.) of the silicon.

In accordance with this invention, there is further provided a novel electrical circuit for use in conjunction with hot surface electrical fuel ignitors. The novel circuit comprises a dropping resistor in series with the ignitor. Desirably, for the foregoing reasons, the ignitor comprises silicon carbide and is preferably the silicon carbide composition of the invention. The circuit permits the direct use of normally encountered line voltage of about 120 volts. As a result, an ignitor having a shorter length can be used since the ignitor in reality is operating on the voltage of about 60 volts due to the IR drop across the dropping resistor. In addition, the dropping resistor reduces the effects of electrical changes in the ignitor as the ignitor ages. Since a shorter ignitor can be used, as previously discussed, heat up time is reduced and in addition, the smaller ignitor is easier to mount an appliance such as a range top.

Typically, an ignitor's resistance might increase about 20% during its estimated useful life of 40,000 cycles. Such a change in resistance will substantially affect the heat up time and resulting peak temperature at constant voltage due to a drop in power dissipated by the ignitor. Dissipated power of the ignitor $P_I$ is equal to the square of the circuit current, $I^2$, times the resistance of the ignitor, $R_I$. Therefore $P_I = I^2 R_I$. Since the circuit current, I, is dependent upon the circuit resistance, R, in the relation $I = E/R$, $I^2 = E^2/R^2$ therefore $P_I = E^2/R^2 \times R_2$. When a portion of the circuit resistance is a constant dropping resistor, it is clear that change in the resistance of the ignitor does not create nearly as much change in dissipated power as when the entire circuit resistance is provided by the ignitor. The power dissipated by the ignitor and thus the temperature of the ignitor is therefore stabilized by the presence of a dropping resistor. It has been found for various reasons that the best stabilization occurs when the dropping resistance has a value within about forty percent and preferably within about twenty percent of the initial hot resistance of the ignitor at 1250° C. The stabilizing effect of the dropping resistor is illustrated in Example 1 wherein a series dropping resistor of 115 ohms is used with an ignitor having an initial hot resistance of 174 ohms.

In addition when a dropping resistor is used the heat up time of an ignitor is reduced. This is true because initial power through the circuit is closer to the power dissipated at ignition temperature of the ignitor than the initial dissipated power when a dropping resistor is absent. An inspection of the above $P_I$ power equation shows that a more constant circuit resistance due to the presence of a constant dropping resistor results in less variation in dissipated power from startup to ignition temperature; thus the effect of the high cold resistance of the ignitor upon the power dissipated by the ignitor is reduced.

The addition of the dropping resistor to the circuit can be selected to compensate for variation in different ignitors to assure as essentially constant final ignitor temperature.

What is claimed is:

1. An electrical fuel igniter comprising an elongated body having a composition comprising particulate silicon carbide having an average particle size of less than about twenty microns pressed at a temperature of from about 1800° to about 2400° C. at a pressure of from about 70 to about 750 kilograms per square centimeter for a sufficient time to obtain a density above about 2.5 grams per cubic centimeter, said composition further comprising at least 95.0 weight percent silicon carbide containing from about 0.005 to about 0.05 moles per 100 grams of composition of at least one dissolved negative doping element, said at least one negative doping element being in sufficient mole excess of the total moles of all positive doping elements present in said composition to provide sufficient negative doping to said composition to reduce the cold volume resistivity to less than about 1.25 ohm cms and to reduce the ratio of cold volume resistivity at 20° C. to hot volume resistivity at 1200° C. of less than about 12 to 1, wherein the ignitor is a bar having a length of from about 0.1 to about 5 centimeters and a cross sectional area of from about 0.0002 to about 0.004 square centimeters.

2. An electrical fuel igniter according to claim 1, further defined in that the igniter bar has a length of from about 0.5 to about 5 centimeters; and further defined in that the excess negative doping elements provide a sufficient negative doping to reduce the cold resistivity of the composition to less than 0.9 ohm cm, essentially all of the particles of the particulate silicon carbide have a particle size below about 20 microns and the particulate silicon carbide is pressed for from about 5 to about 400 minutes.

3. An electrical fuel igniter according to claim 2, wherein the composition contains from about 0.015 to about 0.04 moles per 100 grams of composition of at least 1 negative doping element, the at least one excess negative doping element being over about 0.003 moles per 100 grams of composition in excess of the moles per 100 grams of composition of positive doping element in the composition.

4. The electrical fuel igniter of claim 2, wherein the ratio of cold resistivity to hot resistivity is less than about 9 to 1.

5. The electrical fuel igniter of claim 4, wherein the excess negative doping element is over 0.003 moles per 100 grams of composition in excess of the moles per 100 grams of composition of positive doping elements in the composition.

* * * * *